(12) United States Patent
Hasegawa et al.

(10) Patent No.: US 10,071,595 B2
(45) Date of Patent: Sep. 11, 2018

(54) VEHICLE WITH AIRFLOW CONTROL DEVICE

(71) Applicant: FUJI JUKOGYO KABUSHIKI KAISHA, Tokyo (JP)

(72) Inventors: Takumi Hasegawa, Tokyo (JP); Ryuya Kobayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/415,435

(22) Filed: Jan. 25, 2017

(65) Prior Publication Data

US 2017/0282643 A1    Oct. 5, 2017

(30) Foreign Application Priority Data

Mar. 31, 2016   (JP) .................. 2016-071889

(51) Int. Cl.
*B60K 11/08*      (2006.01)
*B60B 7/20*       (2006.01)
*B60K 11/02*      (2006.01)
*B60T 5/00*       (2006.01)

(52) U.S. Cl.
CPC ............. *B60B 7/20* (2013.01); *B60K 11/02* (2013.01); *B60K 11/085* (2013.01); *B60T 5/00* (2013.01); *Y02T 10/88* (2013.01)

(58) Field of Classification Search
CPC ......... B60T 5/00; B60K 11/085; B62D 25/16; B62D 35/00
See application file for complete search history.

(56) References Cited

U.S. PATENT DOCUMENTS

| | | | | |
|---|---|---|---|---|
| 4,772,299 A | * | 9/1988 | Bogusz | B01D 45/04 188/264 AA |
| 5,317,880 A | * | 6/1994 | Spears | B62D 35/001 188/264 A |
| 5,820,225 A | * | 10/1998 | Ferriss | B60B 7/0013 301/37.105 |
| 6,854,544 B2 | * | 2/2005 | Vide | B60K 11/085 180/68.1 |

(Continued)

FOREIGN PATENT DOCUMENTS

| | | | | |
|---|---|---|---|---|
| DE | 102009050967 A1 | * | 5/2011 | ............ B60T 5/00 |
| DE | 102009057164 A1 | * | 6/2011 | ......... B60B 7/0086 |

(Continued)

*Primary Examiner* — Katy M Ebner
(74) *Attorney, Agent, or Firm* — Chip Law Group

(57) ABSTRACT

A vehicle airflow control device includes: a wheel shutter that is provided to a vehicle wheel, and is movable by a driving mechanism between an open position at which an opening between spokes of the vehicle wheel is brought into an open state and a closed position at which the opening is brought into a closed state; a shutter device that is provided to an introduction path of an air into an engine compartment, and is switchable between an open state in which an air is permitted to be introduced and a closed state in which an introduction of an air is blocked; and a control mechanism that actuates the driving mechanism to move the wheel shutter to either one of the open position and the closed position in accordance with the open and closed states of the shutter device.

11 Claims, 8 Drawing Sheets

(56) References Cited

U.S. PATENT DOCUMENTS

| | | | | |
|---|---|---|---|---|
| 7,600,615 | B2* | 10/2009 | Ramsay | B60T 5/00 188/264 AA |
| 8,316,974 | B2* | 11/2012 | Coel | B60K 11/085 165/44 |
| 8,794,363 | B2* | 8/2014 | Wolf | B60K 11/085 180/68.1 |
| 2012/0318476 | A1* | 12/2012 | Begleiter | B60K 11/085 165/51 |
| 2015/0152774 | A1* | 6/2015 | Ritz | F01P 1/06 454/155 |
| 2015/0217734 | A1* | 8/2015 | Cheeseman | B60T 5/00 701/49 |
| 2015/0322845 | A1* | 11/2015 | Nam | F02B 29/0443 123/41.21 |
| 2015/0345578 | A1* | 12/2015 | Nightingale | B60K 11/085 188/264 AA |
| 2016/0016617 | A1* | 1/2016 | Wolf | B62D 37/02 296/208 |
| 2016/0052369 | A1* | 2/2016 | Herbig | B60H 1/3421 454/155 |
| 2016/0176450 | A1* | 6/2016 | Wolf | B60K 11/04 180/68.2 |
| 2016/0222867 | A1* | 8/2016 | Lee | B60K 11/085 |
| 2016/0272258 | A1* | 9/2016 | Gibson | F16D 65/847 |
| 2017/0015190 | A1* | 1/2017 | Yoon | B62D 35/005 |
| 2017/0082092 | A1* | 3/2017 | Gaither | F03D 9/32 |
| 2017/0101140 | A1* | 4/2017 | Parry-Williams | B62D 37/02 |
| 2017/0144533 | A1* | 5/2017 | Gilotte | B60K 11/085 |

FOREIGN PATENT DOCUMENTS

| | | |
|---|---|---|
| JP | 2006-327548 A | 12/2006 |
| JP | 2007-001503 A | 1/2007 |

* cited by examiner

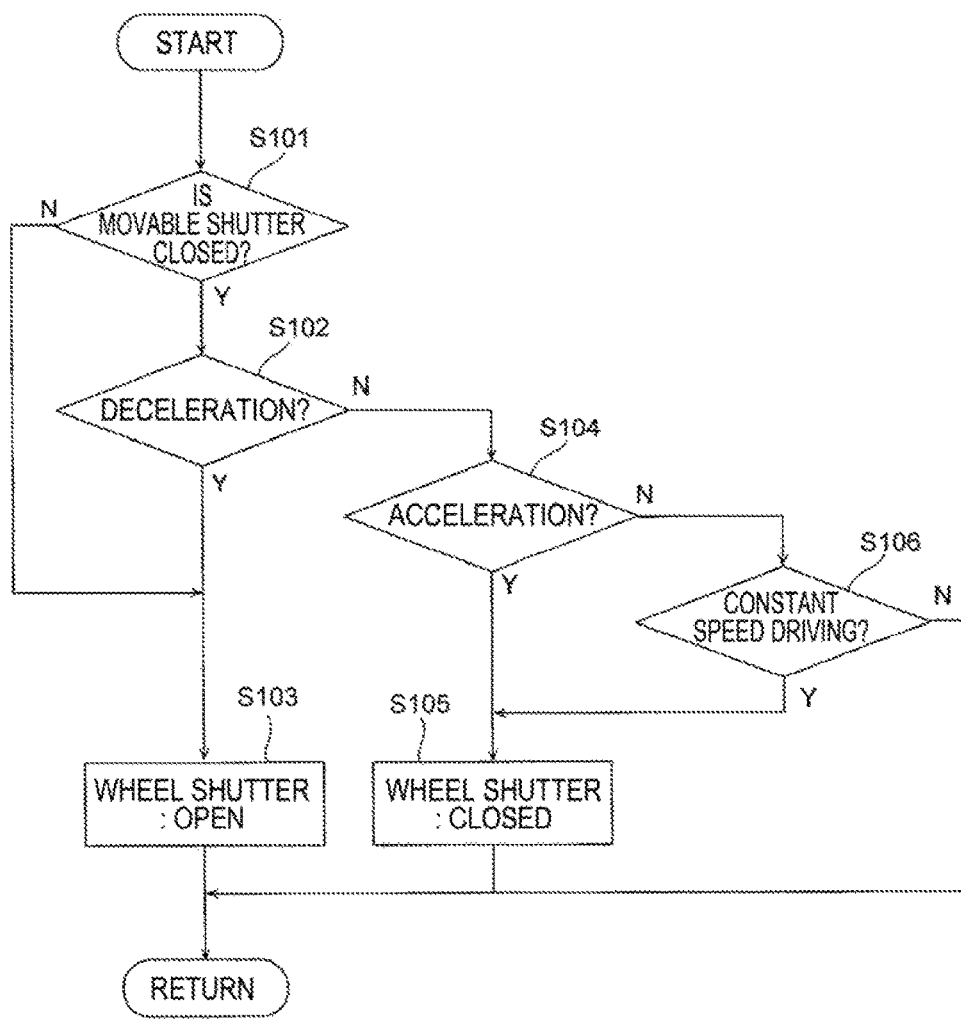

VEHICLE WITH AIRFLOW CONTROL DEVICE

CROSS-REFERENCE TO RELATED APPLICATIONS

The present application claims priority from Japanese Patent Application No. 2016-071889 filed on Mar. 31, 2016, the entire contents of which are hereby incorporated by reference.

BACKGROUND

1. Technical Field

The present invention relates to vehicle airflow control devices. In particular, the present invention relates to a vehicle airflow control device including a wheel shutter that is capable of opening and closing an opening between spokes of a vehicle wheel.

2. Related Art

The air flowing around a traveling vehicle includes the air entering the engine compartment from the bumper at the front of the vehicle, and passes through the openings of the vehicle wheels to flow along the sides of the vehicle. When the vehicle travels, this airflow offers a brake cooling effect. However, when the vehicle travels at high speed, this airflow interferes with air flowing along the sides of the vehicle on the outer sides of the vehicle wheels, and serves as air resistance to lower the aerodynamic performance.

To lessen such air resistance, Japanese Unexamined Patent Application Publication (JP-A) No. 2006-327548 describes a wheel control device including a wheel shutter that is provided to a vehicle wheel, and movable between an open position at which an opening of the vehicle wheel is brought into an open state and a closed position at which the opening is brought into a closed state. This device moves the wheel shutter to the closed position to suppress the air flowing out from an opening of the vehicle wheel to the outside of the vehicle when the vehicle travels at high speed.

As a device that lessens the air resistance caused by the airflow introduced into the engine compartment, for example, JP-A No. 2007-001503 describes a shutter device that is provided to the introduction path of air into the engine compartment, and switchable between an open state in which the introduction of air is permitted and a closed state in which the introduction of air is blocked. This shutter device can lessen the air resistance and improve the fuel consumption efficiency by cooling the coolant of the radiator in the engine compartment in the open state, while entering the closed state when the vehicle travels at high speed.

The devices described in JP-A No. 2006-327548 and JP-A No. 2007-001503 can each improve the fuel consumption efficiency of the vehicle.
The combination of these devices, however, abruptly increases the air pressure in the engine compartment, the wheel house, or the like if the shutter device is brought into the open state to cool the radiator or the like in the engine compartment with the opening of the vehicle wheel in the closed state. As a result, lift acts on the vehicle, and unfortunately makes the position of the vehicle unstable.

SUMMARY OF THE INVENTION

It is desirable to provide a vehicle airflow control device that can prevent increase in the lift that acts on a vehicle, while improving the fuel consumption efficiency.

An aspect of the present invention provides a vehicle airflow control device including: a wheel shutter that is provided to a vehicle wheel, and is movable by a driving mechanism between an open position at which an opening between spokes of the vehicle wheel is brought into an open state and a closed position at which the opening is brought into a closed state; a shutter device that is provided to an introduction path of an air into an engine compartment, and is switchable between an open state in which an air is permitted to be introduced and a closed state in which an introduction of an air is blocked; and a control mechanism that actuates the driving mechanism to move the wheel shutter to either one of the open position and the closed position in accordance with the open and closed states of the shutter device.

When the shutter device is in the open state, the control mechanism may move the wheel shutter to the open position.

When the shutter device is in the closed state, the control mechanism may move the wheel shutter in accordance with a driving state of a vehicle.

When the shutter device is in the closed state, and the driving state of the vehicle is either one of an acceleration driving and a constant speed driving, the control mechanism may move the wheel shutter to the closed position.

When the shutter device is in the closed state, and the driving state of the vehicle is a deceleration driving, the control mechanism may move the wheel shutter to the open position.

The shutter device may be a grille shutter device that is capable of opening and closing an opening formed on a front face of a vehicle.

BRIEF DESCRIPTION OF THE DRAWINGS

FIG. 5 is a flowchart illustrating processing that is performed by a control unit;

DETAILED DESCRIPTION

Figure 1:
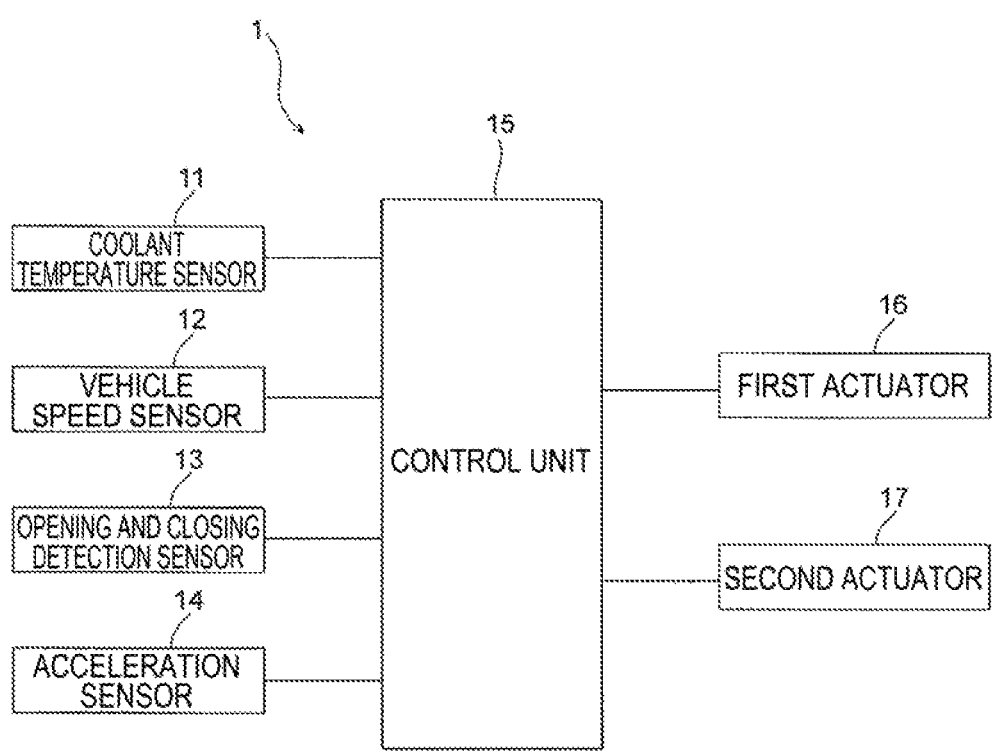
FIG. 1 is a block diagram illustrating a control mechanism of a vehicle airflow control device according to an implementation of the present invention.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

Figure 2:
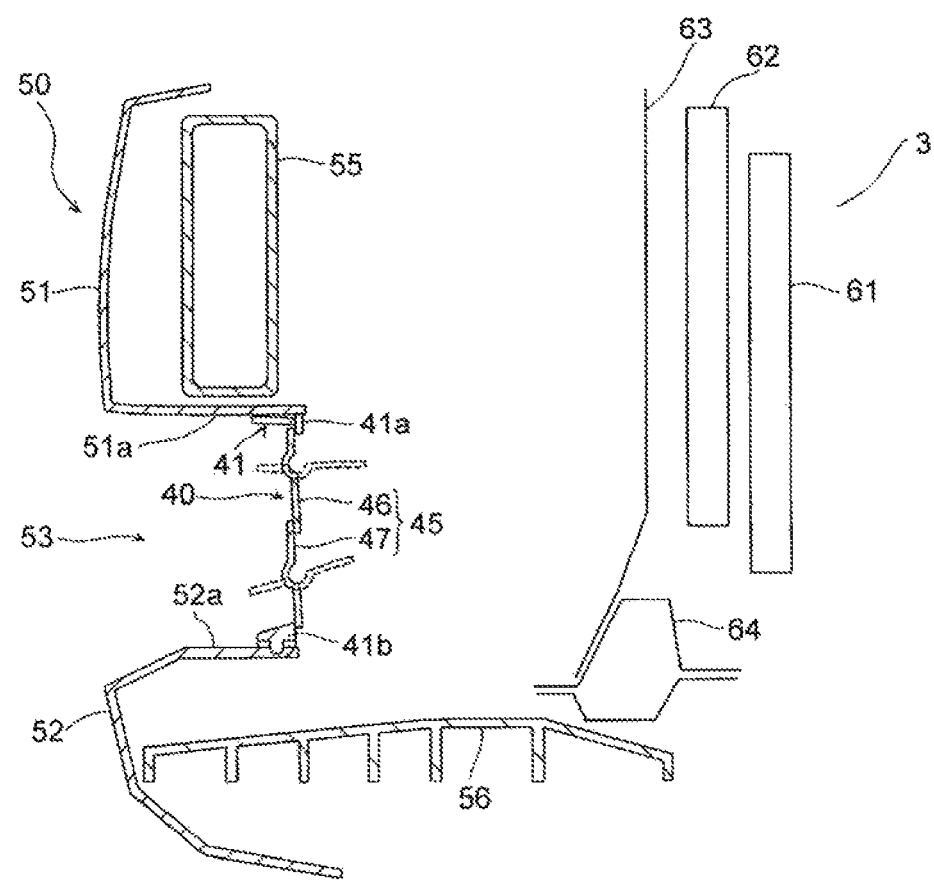
FIG. 2 describes a grille shutter device, and is a longitudinal sectional view taken at a center of a vehicle front end with respect to a width direction.

FIG. 1 is a block diagram illustrating a control mechanism of a vehicle airflow control device 1 according to an implementation of the present invention. The vehicle airflow control device 1 includes a coolant temperature sensor 11, a vehicle speed sensor 12, an opening and closing detection sensor 13, an acceleration sensor 14, a control unit 15, a first actuator 16, and a second actuator 17. In one implementation, the control unit 15 may serve as a "control mechanism." In one implementation, the second actuator 17 may serve as a "driving mechanism." The first actuator 16 actuates a movable shutter 45 of a grille shutter device 40 provided to the front end of the vehicle, and the second actuator 17 actuates a wheel shutter 30 provided to a vehicle wheel 20 (see FIGS. 6A to 7B). In one implementation, the grille shutter device 40 may serve as a "shutter device." As illustrated in FIG. 2, the front of the vehicle includes a bumper 50, a bumper beam 55, an energy absorbing material (EA material) 56, a radiator 61, a condenser 62, and a radiator panel 63. The bumper 50 has a bumper grille opening 53. In one implementation, the bumper grille opening 53 may serve as an "introduction path of air." The air (outside air) introduced from the bumper grille opening 53 is introduced into an engine compartment 3 through a duct 4. The bumper 50 is provided with the grille shutter device 40 including the movable shutter 45 that is capable of substantially opening and closing the bumper grille opening 53.

The bumper 50 is an exterior member provided to the vehicle front end, and is formed of a resin material such as PP. The bumper 50 includes a main body 51 and an air dam 52. The main body 51 is disposed under the front grille and the headlights (not illustrated). The air dam 52 is disposed under the main body 51 with space between the air dam 52 and the main body 51. The bumper grille opening 53 is positioned between the main body 51 and the air dam 52. The main body 51 and the air dam 52 each have a substantially U-shaped longitudinal cross section that is open against the back of the vehicle. Each of the main body 51 and the air dam 52 is formed of a plate member extending in the width direction of the vehicle. The upper part of the grille shutter device 40 is fixed to a lower face 51a of the main body 51, while the lower part of the grille shutter device 40 is fixed to an upper face 52a of the air dam 52.

The bumper beam 55 is a member like a beam extending along the width direction. The bumper beam 55 is disposed behind the main body 51 of the bumper 50. The energy absorbing material 56 absorbs the load input from the air dam 52 at the time of collision, and transfers the load to the vehicle body. The energy absorbing material 56 is disposed behind the air dam 52. The energy absorbing material 56 includes a plate extending in the front-back direction of the vehicle, and ribs that are integrated with the plate, extend in the up-down direction, and are arranged in the front-back direction. The ribs are formed on the lower face of the plate.

The radiator 61 cools the coolant of the engine by exchanging heat with traveling wind. The radiator 61 includes a large number of fins disposed around the tube in which the coolant flows. The condenser 62 cools a refrigerant in the gas phase for the air conditioner (not illustrated) by exchanging heat with traveling wind, and condenses the refrigerant to bring the refrigerant into the liquid phase. The condenser 62 is disposed in front of the radiator 61. The condenser 62 includes a large number of fins disposed around the tube in which the refrigerant flows.

The radiator panel 63 is a frame-shaped body structure member provided around the radiator 61 and the condenser 62. The radiator panel 63 supports the radiator 61 and the condenser 62. There is a lower radiator support panel 64 disposed under the radiator panel 63. The lower radiator support panel 64 has a closed cross section, and extends in the width direction of the vehicle.

The grille shutter device 40 is provided to the bumper grille opening 53, and substantially opens and closes the bumper grille opening 53. The grille shutter device 40 includes a frame 41, the movable shutter 45, and the first actuator 16 that actuates the movable shutter 45.

The frame 41 is disposed along the inner marginal portion of the bumper grille opening 53, and substantially shaped like a rectangle in a front view of the vehicle showing the front of the vehicle. An upper part 41a of the frame 41 is fixed to the main body 51 of the bumper 50, while a lower part 41b of the frame 41 is fixed to the air dam 52 of the bumper 50.

The movable shutter 45 includes an upper louver 46 and a lower louver 47. The upper louver 46 and the lower louver 47 are movable louvers that pivot on a rotation axis extending in the width direction of the vehicle to open and close the inner opening of the frame 41. The upper louver 46 and the lower louver 47 can respectively block the upper half and lower half of the frame 41.

Figure 3:
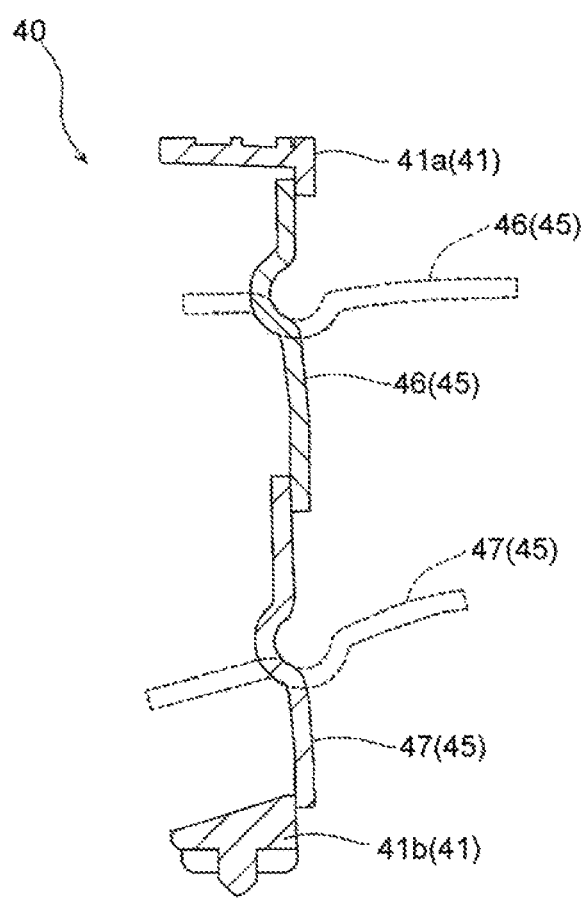
FIG. 3 is an enlarged view of required parts of FIG. 2, and describes open and closed states of a movable shutter.

The movable shutter 45 uses the first actuator 16 to pivot the upper louver 46 and the lower louver 47, thereby substantially blocking the inside (i.e., bumper grille opening 53) of the frame 41 as illustrated by the solid line in FIG. 3 to create a closed state in which the introduction of air is blocked. The first actuator 16 pivots the upper louver 46 and the lower louver 47 in this closed state, thereby creating an open state in which air can flow through the inside of the frame 41 as illustrated by the dashed line in FIG. 3, and air can be introduced into the engine compartment 3.

Figure 4A:
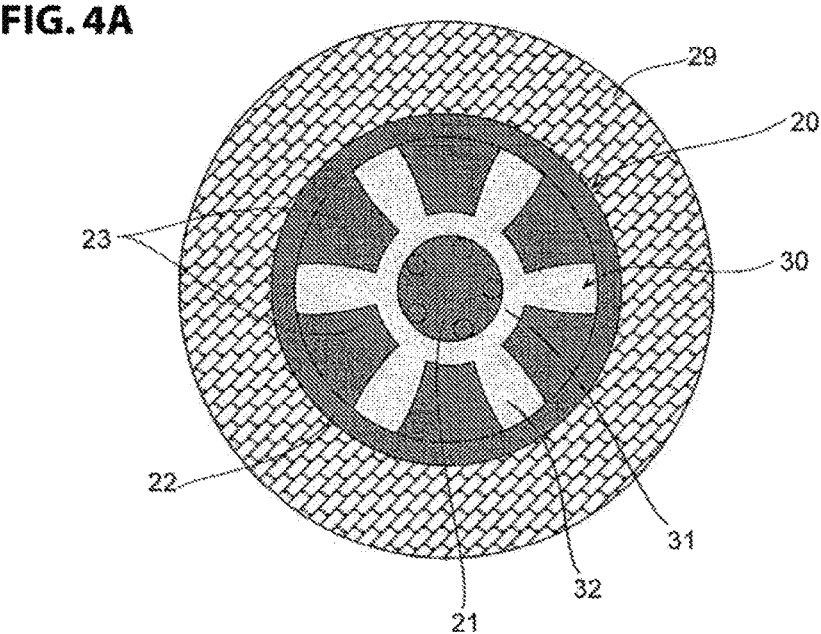
FIG. 4A illustrates a wheel including a wheel shutter, and a closed state of an opening of a vehicle wheel.
Figure 4B:
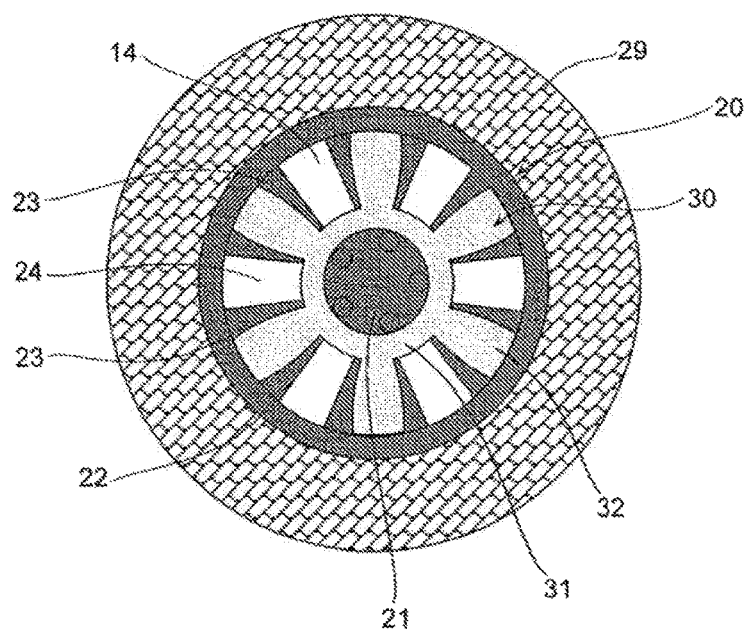
FIG. 4B illustrates a wheel including a wheel shutter, and an open state of an opening of a vehicle wheel.

FIGS. 4A and 4B each illustrate the back side of a wheel including the wheel shutter 30 (the inner side of the vehicle). The vehicle wheel 20 includes a wheel center 21, a rim 22 on which a tire 29 is mounted, and spokes 23 that couple the wheel center 21 to the rim 22. The wheel center 21 is coupled and fixed to a hub 72 that is linked to an end of a drive shaft 71 (see FIGS. 6A and 6B). The drive shaft 71 receives the power of an engine EG via a transmission TM. A brake disc 73 is coupled to the hub 72, and installed on the inside of the rim 22. The spokes 23 radially extend from the wheel center 21. The tips of the spokes 23 are coupled to the inner circumferential surface of the rim 22.

The wheel shutter 30 can pivot on the vehicle wheel 20 through the actuation of the second actuator 17 attached to the wheel center 21. Specifically, the wheel shutter 30 is movable by the second actuator 17 between an open position at which an opening 24 between the spokes 23 is opened and a closed position at which the opening 24 is substantially closed. The wheel shutter 30 and the second actuator 17 are provided to at least each of the left and right front wheels. In the present implementation, the wheel shutter 30 and the second actuator 17 are provided to each of the left and right front and rear wheels. The wheel shutter 30 is provided on the back side (the inner side of the vehicle) of the vehicle wheel 20. The wheel shutter 30 includes an annular portion 31 that is mounted on the wheel center 21, and shutters 32 that radially extend from the annular portion 31.

The annular portion 31 is mounted on the outer circumference of the wheel center 21. Each of the shutters 32 has a size at which the shutter 32 can close the opening 24 of the vehicle wheel 20 and can be housed in the back face of the spoke 23 at the open position. This wheel shutter 30 is pivoted clockwise to the open position illustrated in FIG. 4B by the biasing force of a spring (not illustrated) in FIG. 4. Meanwhile, the driving force of the second actuator 17 pivots the wheel shutter 30 counterclockwise to the closed position illustrated in FIG. 4A against the biasing force of the spring. The shape and configuration of the wheel shutter 30 are not limited to those in the illustrated example. The wheel shutter 30 can have any shape and configuration as long as the wheel shutter 30 is capable of opening and closing the opening 24 of the vehicle wheel 20.

The coolant temperature sensor 11 detects the temperature of the coolant of the engine. The vehicle speed sensor 12 detects the speed of the vehicle. The opening and closing detection sensor 13 detects the open and closed states of the movable shutter 45. The acceleration sensor 14 detects the acceleration of the vehicle.

The control unit 15 is coupled to the coolant temperature sensor 11 and the vehicle speed sensor 12. The control unit 15 actuates the first actuator 16 on the basis of detection signals from these sensors in a manner that the movable shutter 45 enters either one of the open state and the closed state. For example, if the detected temperature of the coolant by the coolant temperature sensor 11 is low, and high speed driving is applied in which the detected vehicle speed by the vehicle speed sensor 12 is higher than predetermined vehicle speed, the first actuator 16 is actuated in order to enhance the driving stability in a manner that the movable shutter 45 enters the closed state. If the detected temperature of the coolant by the coolant temperature sensor 11 is high, the first actuator 16 is actuated in a manner that the movable shutter 45 enters the open state.

In addition, the control unit 15 is coupled to the opening and closing detection sensor 13 and the acceleration sensor 14. The control unit 15 actuates the second actuator 17 on the basis of detection signals from these sensors in a manner that the wheel shutter 30 moves to either one of the open position and the closed position.

Next, the processing for the control unit 15 to control the movement of the wheel shutter 30 will be described. FIG. 5 is a flowchart illustrating processing that is performed by the control unit 15.

First of all, the control unit 15 determines whether the movable shutter 45 is in the closed state, on the basis of a detection signal from the opening and closing detection sensor 13 (step S101).

If the movable shutter 45 is in the closed state (step S101: Yes), it is determined on the basis of a detection signal from the acceleration sensor 14 whether the driving state of the vehicle is deceleration driving (step S102). If the driving state is deceleration driving (step S102: Yes), the control unit 15 actuates the second actuator 17 to move the wheel shutter 30 to the open position (step S103). The processing then terminates (returns).

If the driving state is not deceleration driving (step S102: No), it is determined whether the driving state is acceleration driving (step S104). If the driving state is acceleration driving (step S104: Yes), the control unit 15 actuates the second actuator 17 to move the wheel shutter 30 to the closed position (step S105). The processing then terminates (returns).

If the driving state is not acceleration driving (step S104: No), it is determined whether the driving state is constant speed driving (step S106). If the driving state is constant speed driving (step S106: Yes), the control unit 15 actuates the second actuator 17 to move the wheel shutter 30 to the closed position (step S105). The processing then terminates (returns).

If the driving state is not constant speed driving (step S106: No), the control unit 15 terminates (returns) the processing.

Meanwhile, if the movable shutter 45 is not in the closed state (i.e., the movable shutter 45 is in the open state) in step S101 (step S101: No), the control unit 15 actuates the second actuator 17 to move the wheel shutter 30 to the open position (step S103). The processing then terminates (returns).

The vehicle airflow control device 1 as discussed above can adopt first to third modes as illustrated in FIGS. 6A to 8B in accordance with the open and closed states of the grille shutter device 40 and the driving state of the vehicle. Additionally, FIGS. 6A to 8B each use an arrow to illustrate the flow of traveling wind (airflow). The side views of FIGS. 6A, 7A, and 8A each use a solid line to illustrate the grille shutter device 40.

Figure 6A:
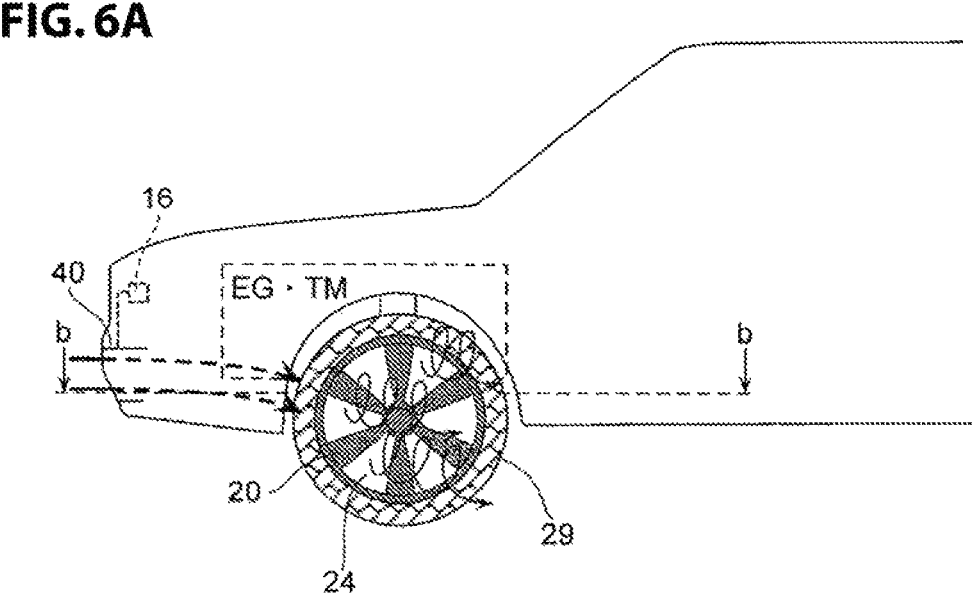
FIG. 6A is a schematic side view for describing airflow when the movable shutter is in the open state.
Figure 6B:
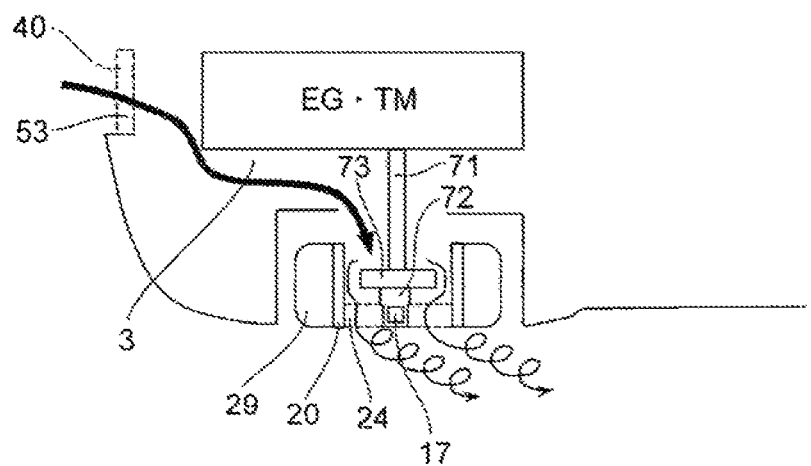
FIG. 6B is a cross-sectional view taken along a b-b line of FIG. 6A.

As an example, when the actuation of the first actuator 16 brings the movable shutter 45 into the open state with the wheel shutter 30 located at the closed position, the opening 24 of the vehicle wheel 20 can be brought into the open state like the first mode illustrated in FIGS. 6A and 6B. This can eject the air introduced into the engine compartment 3 from the bumper grille opening 53 at the vehicle front end toward the sides of the vehicle from the opening 24, thereby preventing increase in the lift that acts on the vehicle.

If the movable shutter 45 is brought into the closed state, and less air is introduced into the engine compartment 3 to prevent increase in the lift, it is possible to control the movement of the wheel shutter 30 in accordance with the driving state, and to allow the vehicle to travel with less fuel.

Figure 7A:
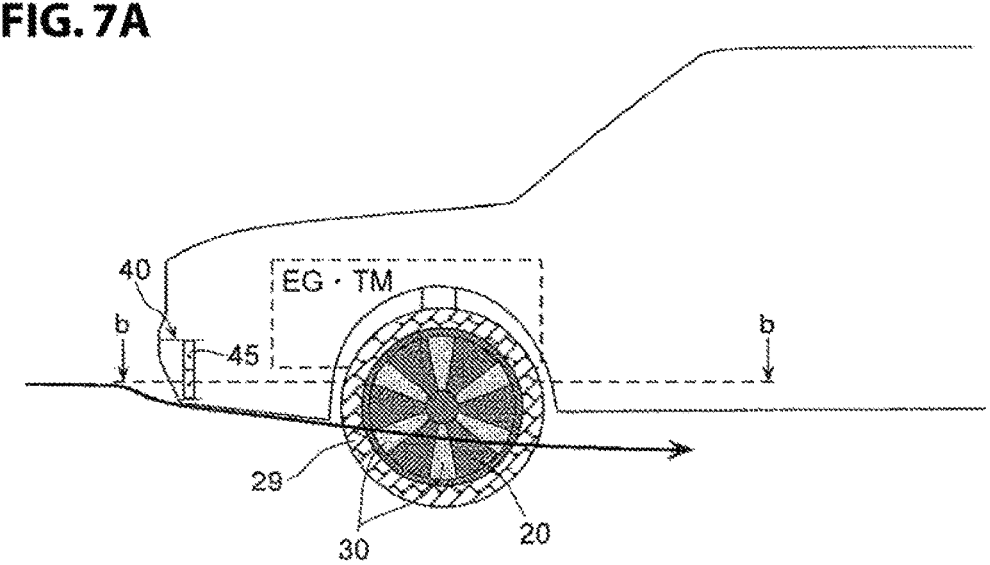
FIG. 7A is a schematic side view illustrating airflow when the movable shutter is in the closed state, and the opening of the vehicle wheel is in the closed state.
Figure 7B:
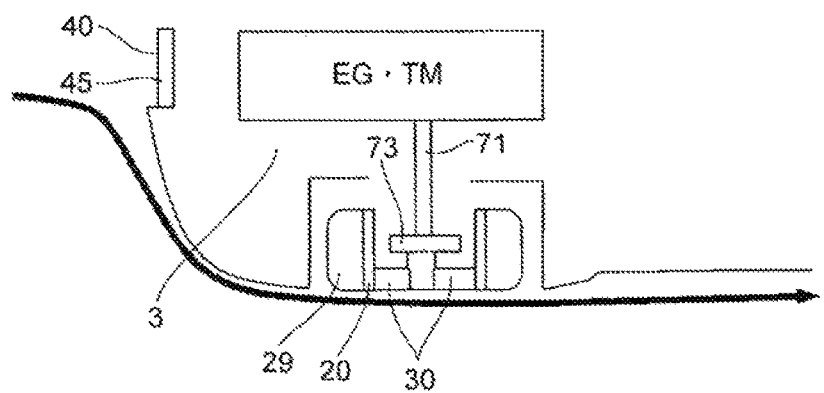
FIG. 7B is a cross-sectional view taken along a b-b line of FIG. 7A.

Specifically, like the second mode illustrated in FIGS. 7A and 7B, if the driving state of the vehicle is either one of acceleration driving and constant speed driving, moving the wheel shutter 30 to the closed position makes it possible to prevent the air flowing out from the opening 24 from interfering with the air flowing along the sides of the vehicle and from making the traveling wind turbulent. This can lessen the air resistance to improve the fuel consumption efficiency. The use of the movable shutter 45 to bring the bumper grille opening 53 formed on the front face of the vehicle into the closed state makes it possible to enhance the aerodynamic performance of the front face of the vehicle and to improve the fuel consumption efficiency.

Figure 8A:
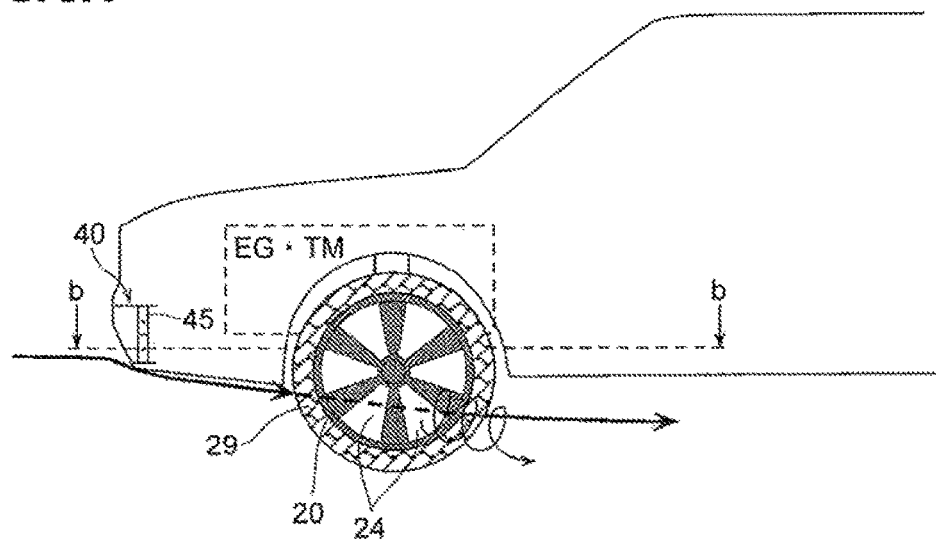
FIG. 8A is a schematic side view illustrating airflow when the movable shutter is in the closed state, and the opening of the vehicle wheel is in the open state.
Figure 8B:
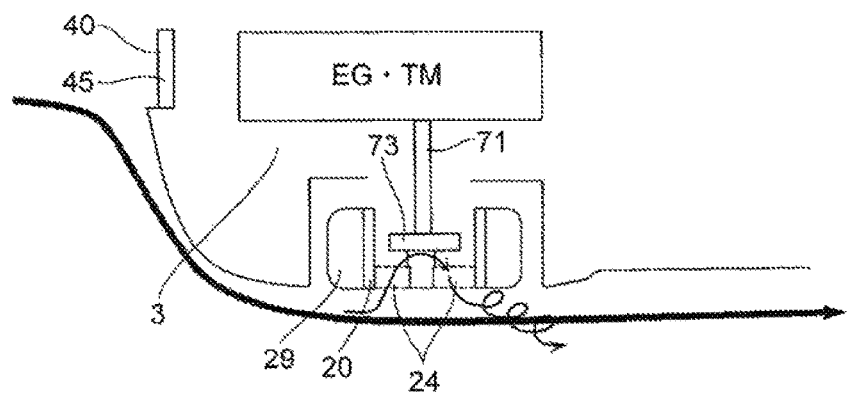
FIG. 8B is a cross-sectional view taken along a b-b line of FIG. 8A.

Like the third mode illustrated in FIGS. 8A and 8B, if the driving state of the vehicle is deceleration driving, moving the wheel shutter 30 to the open position offers a brake cooling effect brought about by the air passing through the opening 24. In addition, the airflow ejected from the opening 24 increases the air resistance, expecting increase in the deceleration effect.

Additionally, the present invention is not limited to above-described implementation, but various modifications or variations are possible insofar as they are within the technical scope of the appended claims or the equivalents thereof. For example, the grille shutter device 40 that is capable of opening and closing the bumper grille opening 53 is used as a shutter device in the present implementation. However, the shutter device that cooperates with the movement of the wheel shutter 30 only has to be provided to the introduction path of air into the engine compartment 3, and switchable between the open state in which air can be introduced and the closed state in which the introduction of air is substantially blocked. For example, the shutter device may also be a front grille shutter device that is capable of opening and closing an opening of a front grille disposed above the bumper 50. The shutter device may also be installed inside a duct through which the air introduced from an opening formed on the front face of the vehicle is guided into the engine compartment 3, and the shutter device may be capable of opening and closing the airflow path.

In the above-described implementation, the control unit 15 determines the open and closed states of the movable shutter 45 on the basis of a detection signal from the opening and closing detection sensor 13. However, the open and closed states of the movable shutter 45 may also be determined on the basis of a control signal that actuates the first actuator 16.

According to this configuration, it is possible to adjust not only the air pressure in a wheel house, but also the air pressure in the engine compartment by controlling the open and closed states of the opening of the vehicle wheel in accordance with the open and closed states of the shutter device provided to the introduction path of air into the engine compartment. Accordingly, it is possible to appropriately balance the lift that acts on the vehicle with the air flowing around the vehicle. This makes it possible to lessen the air resistance caused by the airflow to improve the fuel consumption efficiency while preventing increase in the lift.

According to this configuration, if the shutter device enters the open state, and more air is introduced into the engine compartment, it is possible to bring the opening of the vehicle wheel into the open state, and to actively eject the air from the opening to prevent increase in the lift.

According to this configuration, if the shutter device enters the closed state, and less air is introduced into the engine compartment, or increase in the lift is prevented, it is possible to control the movement of the wheel shutter in accordance with the driving state of the vehicle, thereby controlling the air flowing along the sides of the vehicle to allow the vehicle to travel with less fuel.

According to this configuration, it is possible to prevent increase in the lift by bringing the shutter device into the closed state, and to lessen the air resistance caused by the air flowing out from the opening of the vehicle wheel by bringing the opening into the closed state. It is possible to improve the fuel consumption efficiency by lessening the air resistance in this way when accelerating the vehicle or keeping the vehicle traveling at constant speed.

According to this configuration, it is possible to prevent increase in the lift by bringing the shutter device into the closed state, and to cool the brake used at the time of deceleration with the air passing through the opening of the vehicle wheel by bringing the opening into the open state.

According to this configuration, it is possible to enhance the aerodynamic performance of the front face of the vehicle to improve the fuel consumption efficiency by bringing the opening formed on the front face of the vehicle into the closed state with the grille shutter device.

The vehicle airflow control device according to an implementation of the present invention can prevent increase in the lift that acts on the vehicle, while improving the fuel consumption efficiency.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A vehicle, comprising:
a vehicle wheel comprising a wheel shutter, the wheel shutter being movable by a driving mechanism between an open position at which an opening between spokes of the vehicle wheel is brought into an open state and a closed position at which the opening is brought into a closed state;
a vehicle body comprising an engine compartment that accommodates an engine and a shutter device that is provided to an introduction path of an air into the engine compartment, the engine compartment defining an inserted portion where a driving shaft configured to transmit a driving force of the engine to the vehicle wheel is inserted, the inserted portion being adjacent to the vehicle wheel, the shutter device being switchable between an open state in which the air is permitted to be introduced through the introduction path and the inserted portion toward the vehicle wheel and a closed state in which the air is blocked from being introduced through the introduction path and the inserted portion toward the vehicle wheel; and
a control mechanism that actuates the driving mechanism to move the wheel shutter to either one of the open position and the closed position in accordance with the open and closed states of the shutter device,
wherein the control mechanism is configured to:
when the shutter device is in the open state, move the wheel shutter to the open position; and
when the shutter device is in the closed state, execute a determination whether a driving state of the vehicle is any one of a deceleration driving, an acceleration driving and a constant speed driving, and move the wheel shutter, in response to a result of the determination, to the open position or the closed position.

2. The vehicle according to claim 1, wherein when the shutter device is in the closed state, and the driving state of the vehicle is either one of the acceleration driving and the constant speed driving, the control mechanism moves the wheel shutter to the closed position.

3. The vehicle according to claim 1, wherein when the shutter device is in the closed state, and the driving state of the vehicle is the deceleration driving, the control mechanism moves the wheel shutter to the open position.

4. The vehicle according to claim 2, wherein when the shutter device is in the closed state, and the driving state of the vehicle is the deceleration driving, the control mechanism moves the wheel shutter to the open position.

5. The vehicle according to claim 1,
wherein the vehicle body comprises a bumper, and
wherein the shutter device is a grille shutter device that is capable of opening and closing an opening formed on a front face of the bumper.

6. The vehicle according to claim 2,
wherein the vehicle body comprises a bumper, and
wherein the shutter device is a grille shutter device that is capable of opening and closing an opening formed on a front face of the bumper.

7. The vehicle according to claim 3,
wherein the vehicle body comprises a bumper, and
wherein the shutter device is a grille shutter device that is capable of opening and closing an opening formed on a front face of the bumper.

8. The vehicle according to claim 4,
wherein the vehicle body comprises a bumper, and wherein the shutter device is a grille shutter device that is capable of opening and closing an opening formed on a front face of the bumper.

9. The vehicle according to claim 1, wherein the wheel shutter is pivoted on a center of the vehicle wheel.

10. The vehicle according to claim 1, wherein the vehicle wheel comprises the wheel shutter including a shutter that is on a back face of at least one of the spokes.

11. The vehicle according to claim 1,
wherein when the shutter device is in the closed state, and the driving state of the vehicle is either one of the acceleration driving and the constant speed driving, the control mechanism moves the wheel shutter to the closed position, and
wherein when the shutter device is in the closed state, and the driving state of the vehicle is the deceleration driving, the control mechanism moves the wheel shutter to the open position.

\* \* \* \* \*